United States Patent [19]

Chihiro et al.

[11] 4,036,920

[45] July 19, 1977

[54] PROCESS FOR THE PREPARATION OF FUEL KERNELS

[75] Inventors: Oizumi Chihiro, Hachioji; Uesugi Juno, Nobeoka, both of Japan

[73] Assignee: Asahi Kasei Kogyo Kabushiki Kaisha, Osaka, Japan

[21] Appl. No.: 683,999

[22] Filed: May 6, 1976

[51] Int. Cl.$^2$ .............................................. G21C 21/00
[52] U.S. Cl. .................................... 264/.5; 176/78; 252/301.1 R; 536/1
[58] Field of Search .................... 264/.5; 252/301.1 R, 252/301.1 S; 536/1; 176/78

[56] References Cited

U.S. PATENT DOCUMENTS

| | | | |
|---|---|---|---|
| 3,396,082 | 8/1968 | Davis et al. | 536/1 X |
| 3,716,605 | 2/1973 | Grimes et al. | 264/.5 |
| 3,754,925 | 8/1973 | Kimura et al. | 536/1 X |
| 3,776,987 | 12/1973 | Grimes et al. | 264/.5 |
| 3,822,250 | 7/1974 | Kimura et al. | 536/1 X |
| 3,856,775 | 12/1974 | Fukuoka et al. | 536/1 X |

*Primary Examiner*—Peter A. Nelson
*Attorney, Agent, or Firm*—Burgess, Dinklage & Sprung

[57] ABSTRACT

A process for the preparation fuel kernels for coated particle fuels for use in a high temperature gas-cooled reactor comprising granulating a blend of $\beta$-1,4-glucan powder, a fissile metal compound such as a thorium, uranium or plutonium compound and a dispersion medium such as water or an organic solvent; and subjecting the resulting granules to drying-firing to produce small spheres. The firing operation in this invention can be easily done as compared with that in the conventional process, for example the ion exchange resin process. By the process of this invention it is easily possible to control the fissile metal content and the bulk density of the fuel kernel.

13 Claims, No Drawings

PROCESS FOR THE PREPARATION OF FUEL KERNELS

This invention relates to a process for the preparation of fuel kernels. More particularly, this invention is concerned with a process for the preparation of small spheres of carbide or oxide fuels to be coated with pyrolytic carbon and/or silicon carbide for use in high-temperature gas-cooled reactor (hereinafter referred to as "HTGR") fuel elements.

Recently, the developments in utilization of HTGR have been remarkable in the field of atomic energy. In such developments there have been proposed, for the preparation of fuel kernels for use in HTGR, the following methods: (1) powder metallurgy method, (2) particle melting method, (3) solgel method and (4) ion exchange resin method. All of such conventional methods, however, have various drawbacks. For example, according to the methods (1) and (2) above, there can not be obtained low-density products; according to the method (3) above, the preparation is complicated; and according to the method (4) which has been investigated for its superiority in remote operation-ability, the ion exchange resins to be used are expensive, the exchange resin particle size distribution is broad and various problems still remain, for example ion exchanging capacity, amount of remaining carbon after firing, etc. Further with respect to method (4) above, for example, with respect to plutonium fuels, an effective atomic valency of the plutonium in an aqueous solution of plutonium nitrate to be employed as an ion exchange reaction solution is 3 and hence the ion exchange capacity in such solution is small. For this reason, the plutonium should be converted to its complex form to have an atomic valency of 2, leading to complications in the process. Further, since the strongly acidic ion exchange resin to be employed as an ion exchange resin has a sulfonate group, the use of such resin causes the sulfur values to remain in the microsphere product after carbonization. Such contamination of the product with sulfur leads to a serious problem.

Therefore, it is an object of the present invention to provide a process for the preparation of fuel kernels, which is capable of producing fuel kernels excellent in properties as small spheres of oxide and/or carbide fuels to be coated with pyrolytic carbon and/or silicon carbide for use in HTGR fuel blocks.

It is another object of the present invention to provide a process for the preparation of fuel kernels, which is capable of controlling in a wide range the kind and amount of fissile material in the fuel kernel, the ratio of metal to carbon in the fuel kernel and the bulk density of the fuel kernel, leading to an increase in the degree of freedom in designing of a fuel.

It is still another object of the present invention to provide a process of the character described, which can be conducted easily and at a reasonable cost.

The foregoing and other objects, features and advantages of the present invention will be apparent to those skilled in the art from the following detailed description and appended claims.

Essentially, according to the present invention, there is provided a process for the preparation of fuel kernels of coated particle fuels for use in a high-temperature gas-cooled reactor comprising adding $\beta$-1,4-glucan powder to at least one compound selected from the group consisting of a thorium compound, an uranium compound and a plutonium compound, granulating the blend in the presence of a dispersion medium to produce small spheres and subjecting the resulting small spheres to drying-firing.

In the process of the present invention, there is effectively employed cellulose powder having excellent sphere-forming ability, blending ability and granular-forming ability. In this invention, the cellulose powder means $\beta$-1,4-glucan which can be obtained from vegetable cellulose through chemical decomposition and/or mechanical pulverization thereof. The particle size of $\beta$-1,4-glucan is not particularly critical but the powders having an average particle diameter of 10 to 60 $\mu$ may be advantageously employed. The particle size of $\beta$-1,4-glucan has an influence on the bulk density of the microspherical product.

According to the process of the present invention, the $\beta$-1,4-glucan powder and a fissile metal compound such as compounds of thorium, uranium and/or plutonium are kneaded-comminuted and granulated in the presence of a dispersion medium. In this step, various manners may practically be employed. Generally, the $\beta$-1,4-glucan powder may be added to a solution or dispersion of a fissile metal compound in water and/or an organic solvent and then subjected to a kneading and comminuting operation. The solution may partially contain a dispersion, and vice versa. Alternatively, the $\beta$-1,4-glucan powder may be added to a fissile metal compound in the form of powder and then water and/or an organic solvent is added thereto, followed by kneading and comminuting.

As the fissile metal compounds there can be mentioned nitrates, oxides and organic carboxylic acid salts such as acetates of thorium, uranium and plutonium.

The dispersion media to be employed in the process of the present invention include water, organic solvents and mixtures thereof. As the organic solvents, there can be mentioned mono- or di-hydric alcohols having 1 to 6 carbon atoms such as methanol and ethanol, dialkylformamides such as dimethylformamide, dimethyl sulfone and methyl cellosolve. The ratio of mixing water with an organic solvent is not critical, and the range of from 0 to 100% may be employed. The use of a mixed solvent system has an influence on the mechanical strength of the product.

The mixture of $\beta$-1,4-glucan, a dispersion medium and a fissile metal compound may have the following ratio of components. $\beta$-1,4-Glucan may be employed in an amount of 20 to 40% weight, based on the total weight of the mixture. The dispersion medium may be employed in an amount of 20 to 45% by weight, based on the total weight of the mixture. The fissile metal compound may be employed in an amount of 10 to 25% by weight, calculated as the metal, based on the total weight of the mixture.

The mixture of $\beta$-1,4-glucan, a dispersion medium and a fissile metal compound is then kneaded and comminuted and subsequently subjected to granulation. The granulation operation may advantageously be carried out using an extruding granulator and then a rotating granulator (marumerizer). By such two-step granulation operation, there can be easily obtained small spheres having a diameter ranging from 0.4 to 5 mm. (After firing, they have a diameter ranging from 0.2 to 3 mm.) and a high sphericity (More than 99% of the granules have a ratio of long axis/short axis $\leq$ 1.2.) in a high yield (More than 99% of the granules have a diameter ranging from 0.9 time the average diameter to 1.1 time the average diameter.).

The small spherical granules thus obtained are subsequently subjected to drying-firing. In practice, after the granules are dried, they are gradually heated to 450° C. in an atmosphere of inert gas. It is preferred that this first-stage heating operation (including drying operation) is moderately effected with a gradual temperature elevation. If the heating is not moderate, there tend to occur rapid evaporation of the water and rapid decomposition of the metal compound, leading to damage of the small spherical granules, as will be mentioned in detail later. In this first-stage heating, the thermal decomposition of the cellulose ($\beta$-1,4-glucan) is almost accomplished. Subsequently, the second-stage heating is conducted. When the heating to 800° to 1,200° C. is effected, in case uranyl nitrate is employed as a fissile metal compound, there are obtained small spheres i.e. fuel kernels comprising a mixture of uranium oxide and carbon. When the heating to 1,300° to 1,800° C. is further effected, there are obtained small spheres, i.e. fuel kernels, comprising a mixture of uranium carbide and carbon.

As stated hereinabove, it is preferred that the rate of temperature elevation at the firing or carbonization step is moderate. Illustratively stated, in case the heating is effected at a temperature of 450° C. elevation rate lower, it is preferred to employ a temperature elevation of 50 to 120° C./hour. In case the heating is effected at a temperature of higher than 450° C., it is preferred to employ a temperature elevation rate of 200° to 400° C./hour. By adjustment of a temperature elevation rate to such range, it is possible to adequately control the total volume of cavities and cavity size in the produced fuel kernels and the mechanical strength of the overall structure of fuel kernels.

It is described above that the first-stage heating operation is effected by heating to 450° C. in an atmoshpere of inert gas. Alternatively, after drying, the granules are heated from room temperature to a temperature of 250° to 350° C. at a temperature elevation rate of 50° to 120° C./hour in an oxidizing atmosphere (containing oxygen) and then the atmosphere is replaced by an inert gas such as helium, argon, nitrogen and the like, followed by the second-stage heating. The instant method contributes to shortening of the required time and reduction of the total volume of cavities in the product.

When the ion exchange resin is employed for the production of fuel kernels, the particle shape of the fuel kernel is liable to be destroyed due to melting of the particles unless the metal adsorbing condition or the heating condition of the carbonizing operation is strictly controlled. By contrast, in the process of the present invention, since the cellulose powder does not have a melting point, the small spherical granules do not experience such destruction of the particle shape as occurs in the conventional ion exchange resin. Therefore, the heating operation can be easily conducted.

As described, according to the present invention, it is easily possible to vary the fissile metal content of the produced fuel kernel in a wide range of from 10 to 90% by weight by adjusting the ratio of $\beta$-1,4-glucan powder, fissile metal compound and dispersion medium and the granulating conditions, leading to an easy control of the bulk density and carbon content of the resulting fuel kernel. Further, it should be noted that the fuel kernel production method of the present invention is, suitable for the remote operation necessary for reprocessing of the radioactive [233]U, [239]Pu and Th separated and recovered from the spent fuel.

The characteristic features, effects and advantages of the process of the present invention are illustrated as follows.

1. Addition of $\beta$-1,4-glucan:

Due to a hydrophilic property of the cellulose ($\beta$-1,4-glucan) the blend of $\beta$-1,4-glucan, a metal compound and a dispersion medium such as water is imparted with an extrusion granulatability without removal of water. The blend is liable to have spherical forms in the rotating-granulating operation. In the firing operation, the cellulose is converted to high purity carbon and at the same time functions to form small cavities in the fuel kernel.

2. Kneading and comminuting:

By kneading the blend in the presence of a dispersion medium such as water and/or an organic solvent, the cellulose can be comminuted to particles having an average diameter as small as about 5 $\mu$. Accordingly, the formation of large cavities can be avoided and, at the same time, there is given a high extrusion granulatability.

3. Extrusion granulation:

Depending on the size of screen, the pellets having a desired size can be obtained and, at the same time, the pellets having uniform particle sizes can be obtained in a high yield.

4. Rotating graulation:

This process is required for producing granules having a high sphericality in a high yield. By varying the rotating conditions it is possible to adjust the bulk density of the small sphere products.

5. Firing:

Since $\beta$-1,4-glucan powder is a high purity substance consisting of carbon, hydrogen and oxygen, the thermal decomposition thereof gives a high purity carbon. In addition, as stated before, the cellulose does not have a melting point and, therefore, does not experience any destruction of the particle size. By adjusting the heating conditions, it is possible to control the composition and bulk density of the fuel kernel.

This invention will be more fully illustrated by the following examples, but they are not limiting as to the scope of this invention. In the following examples, all percentages are given on the weight basis unless otherwise specified.

EXAMPLE 1

750 g. of a 35% aqueous solution of uranyl nitrate were added to 450 g. of $\beta$-1,4-glucan powder having an average particle diameter of 40 $\mu$, and then kneaded and comminuted for 30 minutes using a kneader having a capacity of 5 liters. The resultant mass was subjected to extrusion-granulation by the use of Eck Pelletor of EXK-1 type (trade name of an extruding granulator manufactured and sold by Fuji Powder Kogyo Kabushkik Kaisha, Japan) provided with a screen having a screen size of 1 mm and, subsequently, 500 g. of the resulting granules were subjected to rotation-granulation at 500 r.p.m. for 10 minutes by the use of Marumerizer of Q-230 type (trade name of a rotating granulator manufactured and sold by Fuji Powder Kogyo Kabushiki Kaisha, Japan) to obtain small spherical granules. The thus obtained small spherical granules were dried at 60° C. for 10 hours and then at 140° C. for 2 hours to obtain granules having a diameter of 0.5 to 0.6 mm. in a yield of 98%. The dried granules were gradually heated to 450° C. at a rate of temperature elevation of 70° to 90° C./hour in an atmosphere of argon and then heated to 1,200° C. at a rate of temperature elevation of 200° to 240° C./hour in the same atmosphere to obtain rigid, fine microspheres having a diameter of 0.35 to 0.4 mm. The elementary analysis of the product showed $UO_2$, 66.9% and C, 33.0%. The measurement of the volume of small cavities showed that the product had 0.14 ml./g. of small cavities having a radius of 500 A or more. As a result of X-ray anaylsis of carbide particles by the use of XMA (X-ray microanalyser), it was found that uranium was uniformly distributed in the inside and outside of the sphere.

When the dried granules were heated to 1,350° C., the elementary analysis of the product showed that there were $UO_2$, 36.1%, $UC_2$, 33.1% and C, 30.7%.

EXAMPLE 2

The same procedures as described in Example 1 were repeated by using, as cellulose powder, four kind of $\beta$-1,4-glucan powders having average diameters of 10 $\mu$, 20 $\mu$, 50 $\mu$ and 60 $\mu$, respectively. The microsphere products obtained after firing at 1,200° C. had average diameters of 0.30–0.35 mm., 0.30–0.35 mm., 0.35–0.40 mm. and 0.35–0.40 mm., respectively. The elementary analyses of the products showed nearly the same values as shown in Example 1. The measurement of the volume of small cavities showed that the volume of cavities having a radius of 500 A or more was in the range of 0.13 to 0.16 ml./g.

EXAMPLE 3

900 g. of 35% aqueous solution of uranyl nitrate were added to 450 g. of $\beta$-1,4-glucan powder having an average particle diameter of 40 $\mu$, and then kneaded and comminuted for 30 minutes using a kneader having a capacity of 5 liters. The resultant mass was subjected to extrusion-granulation by the use of Eck Pelletor of EXK-1 type (trade name of an extruding granulator manufactured and sold by Fuji Powder Kogyo Kabushiki Kaisha, Japan) provided with a screen having a screen size of 1.2 mm. and, subsequently, 500 g. of the resulting granules were subjected to rotation-granulation at 500 r.p.m. for 10 minutes by the use of Marumerizer of Q-230 type (trade name of a rotating granulator manufacture and sold by Fuji Powder Kogyo Kabushiki Kaisha, Japan) to obtain small spherical granules. The thus obtained small spherical granules were dried at 60° C. for 10 hours and then at 140° C. for 2 hours to obtain granules having a diameter of 0.6 to 0.7 mm. in a yield of 97%. The dried granules were gradually heated to 450° C. at a rate of temperature elevation of 70° to 90° C./hour in an atmosphere of nitrogen and then heated to 1,200° C. at a rate of temperature elevation of 200° to 240° C./hour in the same atmosphere to obtain rigid, fine microspheres having a diameter of up to 0.45 mm. The elementary analysis of the product showed $UO_2$, 75.5% and C, 24.3%. The measurement of the volume of small cavities showed that the product had 0.11 ml./g. of small cavities having a radius of 500 A or more. As a result of X-ray analysis of carbide particles by the use of XMA (X-ray microanalyser), it was found that uranium was uniformly distributed in the inside and outside of the sphere.

EXAMPLE 4

960 g. of a 35% aqueous solution of uranyl nitrate were added to 450 g. of $\beta$-1,4-glucan powder having an average particle diameter of 40 $\mu$, and then kneaded and comminuted for 30 minutes using a kneader having a capacity of 5 liters. The resultant mass was subjected to extrusion-granulation by the use of Eck Pelletor EXK-1 type (trade name of an extruding granulator manufactured and sold by Fuji Powder Kogyo Kabushiki Kaisha, Japan) provided with a screen having a screen size of 1 mm. and, subsequently, 500 g. of the resulting granules were subjected to rotation-granulation at 500 r.p.m. for 10 minutes by the use of Marumerizer of Q-230 type (trade name of a rotating granulator manufactured and sold by Fuji powder Kogyo Kabushiki Kaisha, Japan) to obtain small spherical granules. The thus obtained small spherical granules were dried at 60° C. for 10 hours and then at 140° C. for 2 hours to obtain granules having a diameter of 0.5 to 0.6 mm. in a yield of 97.5%. The dried granules were gradually heated to 450° C. at a rate of temperature elevation of 70° to 90° C./hour in an atomsphere of nitrogen and then heated to 1,200° C. at a rate of temperature elevation of 200° to 240° C./hour in the same atmosphere to obtain rigid, fine microspheres having a diameter of 0.3 to 0.35 mm. The elementary analysis of the product showed $UO_2$, 78.6% and C, 21.3%. The measurement of the volume of small cavities showed that the product had 0.10 ml./g of small cavities having a radius of 500 A or more. As a result of X-ray analysis of carbide particles by the use of XMA (X-ray microanalyser), it was found that uranium was uniformly distributed in the inside and outside of the sphere.

The dried granules were heated to 450° C., in an atmosphere of nitrogen and then heated to 1,450° C. in an atmosphere of argon to obtain rigid, fine microspheres having a diameter of 0.3 to 0.35 mm. The elementary analysis of the product showed $UO_2$, 81.6% and C, 18.4%. The measurement of the volume of small cavities showed that the product had 0.10 ml./g. of small cavities having a radius of 500 A or more. As a result of X-ray analysis of carbide particles by the use of XMA (X-ray microanalyser), it was found that uranium was uniformly distributed in the inside and outside of the sphere.

When the dried granules were heated to 1,800° C., the elementary analysis of the product showed that there were $UO_2$, 86.6% and C, 13.4%.

EXAMPLE 5

The same procedures as described in Example 4 were repeated by using, as cellulose powder, two kinds of $\beta$-1,4-glucan powders having average diameters of 10 $\mu$ and 50 $\mu$, respectively. The microsphere products obtained after firing at 1,200° C. had average diameters of 0.3 mm. and 0.4 mm., respectively. The elementary analyses of the products showed nearly the same values as shown in Example 3. The measurements of volumes of small cavities of the products showed that the volumes of cavities having a radius of 500 A or more were 0.09 ml./g/ and 0.1 ml./g., respectively.

EXAMPLE 6

900 g. of 45% aqueous solution of thorium nitrate were added to 450 g. of $\beta$-1,4-glucan powder having an average particle diameter of 40 $\mu$, and then kneaded and comminuted for 30 minutes using a kneader having a capacity of 5 liters. The resultant mass was subjected to extrusion-granulation by the use of Eck Pelletor of EXK-1 type (trade name of an extruding granulator manufactured and sold by Fuji Powder Kogyo Kabushiki Kaisha, Japan) provided with a screen having a screen size of 0.8 mm. and, subsequently, 500 g. of the resulting granules were subjected to rotation-granulation at 500 r.p.m. for 10 minutes by the use of Marumerizer of Q-230 type (trade name of a rotating granulator manufactured and sold by Fuji Powder Kogyo Kabushiki Kaisha, Japan) to obtain small spherical granules. The thus obtained small spherical granules were dried at 60° C. for 10 hours and then at 140° C. for 2 hours to obtain granules having a diameter of 0.4 to 0.5 mm. in a yield of 98.5%. The dried granules were gradually heated to 450° C. at a rate of temperature elevation of 70° to 90° C./hour in an atmosphere of nitrogen and then heated to 1,200° C. at a rate of temperature elevation of 200° to 240 C./hour in the same atmosphere to obtain rigid, fine microspheres having a diameter of 0.3 to 0.35 mm. The elementary analysis of the product showed $ThO_2$, 76.6% and C, 23.2%. The measurement of the volume of small cavities showed that the product had 0.12 ml./g. of small cavities having a radius of 500 A or more. As a result of X-ray analysis of carbide particles by the use of XMA (X-ray microanalyser), it was found that thorium was uniformly distributed in the inside and outside of the sphere.

EXAMPLE 7

960 g. of a 50% aqueous solution of uranyl nitrate were added to 450 g. of $\beta$-1,4-glucan powder having an average particle diameter of 40 $\mu$, and then kneaded and comminuted for 30 minutes using a kneader having a capacity of 5 liters. The resultant mass was subjected to extrusion-granulation by the use of Eck Pelletor of EXK-1 type (trade name of an extruding granulator manufactured and sold by Fuji Powder Kogyo Kabushiki Kaisha, Japan) provided with a screen having a screen size of 1 mm. and, subsequently, 500 g. of the resulting granules were subjected to rotation-granulation at 700 r.p.m. for 15 minutes by the use of Marumerizer of Q-230 type (trade name of a rotating granulator manufactured and sold by Fuji Powder Kogyo Kabushiki Kaisha, Japan) to obtain small spherical granules. The thus obtained small spherical granules were dried at 60° C. for 10 hours and then at 140° C. for 2 hours to obtain granules having a diameter of 0.45 to 0.55 mm. in a yield of 97.8%. The dried granules were gradually heated to 450° C. at a rate of temperature elevation of 70° to 90° C./hour in an atmosphere of helium and then heated to 1,200° C. at a rate of temperature elevation of 200° to 240° C./hour in the same atmosphere to obtain rigid, fine microspheres having a diameter of 0.27 to 0.32 mm. The elementary analysis of the product showed $UO_2$, 78.6% and C, 21.2%. The measurement of a volume of small cavities showed that the product had 0.09 ml./g. of small cavities having a radius of 500 A or more. As a result of X-ray analysis of carbide particles by the use of XMA (X-ray microanalyser), it was found that uranium was uniformly distributed in the inside and outside of the sphere.

EXAMPLE 8

960 g. of a 50% aqueous solution of uranyl nitrate were added to 450 g. of $\beta$-1,4-glucan powder having an average particle diameter of 40 $\mu$, and then kneaded and comminuted for 30 minutes using a kneader having a capacity of 5 liters. The resultant mass was subjected to extrusion-granulation by the use of Eck Pelletor of EXK-1 type (trade name of an extruding granulator manufactured and sold by Fuji Powder Kogyo Kabushiki Kaisha, Japan) provided with a screen having a screen size of 1 mm and subsequently, 500 g. of the resulting granules were subjected and rotation-granulation at 500 r.p.m. for 10 minutes by the use of Marumerizer of Q-230 type (trade name of a rotating granulator manufactured and sold by Fuji Powder Kogyo Kabushiki Kaisha, Japan) to obtain small spherical granules. The thus obtained small spherical granules were dried at 60° C. for 10 hours and then at 140° C. for 2 hours to obtain granules having a diameter of 0.5 to 0.6 mm. in a yield of 97.5%. The dried granules were gradually heated to 350° C. at a rate of temperature elevation of 50° C./hour in an oxygen-containing atmosphere and then heated to 1,200° C. at a rate of temperature elevation of 200° to 240° C./hour in an atmosphere of nitrogen to obtain rigid, fine microspheres having a diameter of 0.3 to 0.35 mm. The elementary analysis of the product showed $UO_2$, 79.8% and C, 20.1%. The measurement of the volume of small cavities showed that the product had 0.095 ml./g. of small cavities having a radius of 500 A or more. As a result of X-ray analysis of carbide particles by the use of XMA (X-ray microanalyser), it was found that uranium was uniformly distributed in the inside and outside of the sphere.

EXAMPLE 9

1,500 g. of a 70% aqueous solution of uranyl nitrate were added to 450 g. of $\beta$-1,4-glucan powder having an average particle diameter of 40 $\mu$, and then kneaded and comminuted for 30 minutes using a kneader having a capacity of 5 liters. The resultant mass was subjected to extrusion-granulation by the use of Eck Pelletor of EXK-1 type (trade name of an extruding granulator manufactured and sold by Fuji Powder Kogyo Kabushiki Kaisha, Japan) provided with a screen having a screen size of 1 mm and, subsequently, 500 g. of the resulting granules were subjected to rotation-granulation at 500 r.p.m. for 10 minutes by the use of Marumerizer of Q-230 type (trade name of a rotating granulator manufactured and sold by Fuji Powder Kogyo Kabushiki Kaisha, Japan) to obtain small spherical granules. The thus obtained small spherical granuels were dried at 60 ° C. for 10 hours and then at 140 ° C. for 2 hours to obtain granules having a diameter of 0.5 to 0.6 mm. in a yiels of 97%. The dried granules were gradually heated to 450° C. at a rate of temperature elevation of 70° to 90 ° C./hour in an atmosphere of nitrogen and then heated to 1,200° C. at a rate of temperature elevation of 200° to 240°C./hour in the sam e atmosphere to obtain rigid, fine microspheres having a diameter of 0.3 to 0.35 mm. The elementary analysis of the product showed $UO_2$, 90.1% and C, 9.9%. The measurement of the volume of small cavities showed that that the product had 0.095 ml./g. of small cavities having a radius of 500 A or more. As a result of X-ray analysis of carbide particles by the use of XMA (X-ray microanalyser), it was found that uranium was uniformly distributed in the inside and outside of the sphere.

EXAMPLE 10

900 g. of a 45% ethanol solution of uranyl nitrate were added to 450 g. of $\beta$-1,4-glucan powder having an average particle diameter of 40 $\mu$, and then kneaded and comminuted for 30 minutes using a kneader having a capacity of 5 liters. The resultant mass was subjected to extrusion-granulation by the use of Eck Pelletor of EXK-1 type (trade name of an extruding granulator manufactured and sold by Fuji Powder Kogyo Kabushiki Kaisha, Japan) provided with a screen having a screen size of 1.2 mm and, subsequently, 500 g. of the resulting granules were subjected to rotation-granulation at 500r.p.m. for 5 minutes by the use of Marumerizer of Q-230 type (trade name of a rotating granulator manufactured and sold by Fuji Powder Kogyo Kabushiki Kaisha, Japan) to obtain small spherical granules. The thus obtained small spherical granules were dried at 50° C. for an hour and then at 140° C. for 2 hours to obtain granules having a diameter of 0.7 to 0.8 mm. in a yield of 96.3%. The dried granules were gradually heated to 450° C. at a rate of temperature elevation of 70° to 90° C./hour in an atmosphere of nitrogen and then heated to 1,200° C. at a rate of temperature elevation of 200° to 240° C./hour in the same atmosphere to obtain rigid, fine microspheres having a diameter of 0.5 to 0.6 mm. The elementary analysis of the product showed $UO_2$, 75.7% and C, 24.2%. The measurement of a volume of small cavities showed that the product had 0.23 ml./g. of small cavities having a radius of 500 A or more. As a result of X-ray analysis of carbide particles by the use of XMA (X-ray microanalyser), it was found that uraniium was uniformly distributed in the overall portion of inside and outside of the sphere.

EXAMPLE 11

225 g. of thorium oxide powder passed through a 200-mesh screen were added to 450 g. of $\beta$-1,4-glucan powder having an average particle diameter of 30 $\mu$ and blended in a S-shaped blender. Then, 830 g. of water were added to the blend, and kneaded and comminuted for 30 minutes using a kneader having a capacity of 5 liters. The resultant mass was subjected to extrusion-granulation by the use of Eck Pelletor of EXK-1 type (trade name of an extruding granulator manufactured and sold by Fuji Powder Kogyo Kabushiki Kaisha, Japan) provided with a screen having a screen size of 0.6 mm and, subsequently, 600 g. of te resulting granules were subjected to rotation-granulation at 400 r.p.m. for 15 minutes by the use of Marumerizer of Q-230 type (trade name of a rotating granulator manufactured and sold by Fuji Powder Kogyo Kabushiki Kaisha, Japan) to obtain small spherical granules. The thus obtained small spherical granules were dried at 50° C. for 12 hours and then at 150° C. for 1.5 hours to obtain granules having a diameter of 0.35 to 0.4 mm. in a yield of 99%. The dried granules were gradually heated to 300° C. at a rate of temperature elevation of 70° to 90° C./hour in air and then heated to 1,200° C. at a rate of temperature elevation of 200° to 240° C./hour in an atmosphere of argon to obtain rigid, fine microspheres having a diameter of 0.3 to 0.35 mm. The elementary analysis of the product showed $ThO_2$, 77% and C, 22.9%. As a result of X-ray analysis of carbide particles by the use of XMA (X-ray microanalyser), it was found that thorium was uniformly distributed in the inside and outside of the sphere.

EXAMPLE 12

225 g. of thorium oxide powder passed through a 200-mesh screen were added to 450 g. of $\beta$-1,4-glucan powder having an average particle diameter of 40 $\mu$ and blended in a V-shaped blender. Then 800 g. of water were added to the blend, and kneaded and comminuted for 30 minutes using a kneader having a capacity of 5 liters. The resultant mass was subjected to extrusion-granulation by the use of Eck Pelletor of EXK-1 type (trade name of an extruding granulator manufactured and sold by Fuji Powder Kogyo Kabushiki Kaisha, Japan) provided with a screen having a screen size of 0.8 mm. and, subsequently, 500 g. of the resulting granules were subjected to rotation-granulation at 500 r.p.m. for 10 minutes by the use of Marumerizer of Q-230 type (trade name of a rotating granulator manufactured and sold by Fuji Powder Kogyo Kabushiki Kaisha, Japan) to obtain small spherical granules. The obtained small spherical granules were dried at 60° C. for 10 hours and then at 140° C. for 2 hours to obtain granules having a diameter of 0.45 to 0.55 mm. in a yield of 98.5%. The dried granules were gradually heated to 450° C. at a rate of temperature elevation of 70° to 90° C./hour in an atmosphere of nitrogen and then heated to 1,200° C. at a rate of temperature elevation of 200° to 240° C./hour in the same atmosphere to obtain rigid, fine microspheres having a diameter of 0.35 to 0.4 mm. The elementary analysis of the product showed $ThO_2$, 76.7% and C, 23.1%. The measurement of the volume of small cavities showed that the product had 0.16 ml./g. of small cavities having a radius of 500 A or more. As a result of X-ray analysis of carbide particles by the use of XMA (X-ray microanalyser), it was found that thorium was uniformly distributed in the inside and outside of the sphere.

EXAMPLE 13

The same procedures as described in Example 1 were repeated except that instead of addition of a 35% aqueous solution of uranyl nitrate to $\beta$-1,4-glucan powder, 200 g. of uranyl acetate was dissolved in 92 g. of methanol, and the resulting solution was mixed with $\beta$-1,4-glucan powder and then 460 g. of water were added. The microsphere products obtained were found to have nearly the same characteristics as those described in Example 1.

EXAMPLE 14

960 g. of a 50% aqueous solution of thorium nitrate were added to 450 g. of $\beta$-1,4-glucan powder having an average particle diameter of 20 $\mu$, and then kneaded and comminuted for 30 minutes using a kneader having a capacity of 5 liters. The resultant mass was subjected to extrusion-granulation by the use of Eck Pelletor of EXK-1 type (trade name of an extruding granulator manufactured and sold by Fuji Powder Kogyo Kabushiki Kaisha, Japan) provided with a screen having a screen size of 1 mm. and, subsequently, 500 g. of the resulting granules were subjected to rotation-granulation at 500 r.p.m. for 10 minutes by the use of Marumerizer of Q-230 type (trade name of a rotating granulator manufactured and sold by Fuji Powder Kogyo Kabushiki Kaisha, Japan) to obtain small spherical granules. The thus obtained small spherical granules were dried at 60° C. for 10 hours and then at 140°C. for 2 hours to obtain granules having a diameter of 0.5 to 0.6 mm. in a yield of 98%. The dried granules were gradually heated to 450° C. at a rate of temperature elevation of 70° to 90° C./hour in an atmosphere of nitrogen and then heated to 1,200° C. at a rate of temperature elevation of 200 to 240° C./hour in the same atmosphere to obtain rigid, fine microspheres having a diameter of 0.3 to 0.34 mm. The elementary analysis of the product showed $ThO_2$, 78.5% and C, 21.3%. The measurement of the volume of small cavities showed that the product had 0.09 ml./g. of small cavities having a radius of 500 A or more. As a result of X-ray analysis of carbide particles by the use of XMA (X-ray microanalyser), it was found that thorium was uniformly distributed in the inside and outside of the sphere.

EXAMPLE 15

The same procedures as described in Example 13 were repeated by using dimethylformamide instead of methanol. The microsphere products obtained were found to have nearly the same characteristics as those described in Example 1.

EXAMPLE 16

The same procedures as described in Example 13 were repeated using methyl cellosolve instead of methanol. The microsphere products obtained were found to have nearly the same characteristics as those described in Example 1.

COMPARATIVE EXAMPLE 1

The same procedures as described in Example 10 were repeated except that an oxygen-containing atmosphere was employed instead of the atmosphere of nitrogen. The products obtained did not hold a spherical shape and most of them had low mechanical strength.

COMPARATIVE EXAMPLE 2

For comparison, the preparation of fuel kernels was conducted by using Amberlite IRC-72 (trade name of an ion exchange resin produced and sold by Orugano Shokai, Japan) which was an excellent ion-exchange resin for producing fuel kernels for use in HTGR. 300 g. of a 10% aqueous solution of thorium nitrate were added to 30 g. (solid content: 26%) of substantially spherical ion-exchange resin Amberlite IRC-72 and the ion-exchange reaction was carried out for 2 hours. 41.3% of thorium nitrate were adsorbed in the resin. The thus obtained resin was dried at 60° C. for 10 hours and then at 140° C. for 2 hours. The dried resin was gradually heated to 450° C. at a rate of temperature elevation of 70° to 90°C./hour in an atmosphere of nitrogen and heated to 1,200° C. at a rate of temperature elevation of 200° to 240° C./hour in the same atmosphere, and then cooled to 150° C. The obtained substance was a highly expanded foam with a large total volume of cavities and it, did not substantially hold a spherical shape. The shape and the mechanical strength of the obtained substance were considerably inferior to those of the present invention. (Examples 1 to 16)

What is claimed is:

1. A process for the preparation of fuel kernels for coated particle fuels for use in a high-temperature gas-cooled reactor comprising adding β-1,4-glucan powder to at least one compound selected from the group consisting of a thorium compound, an uranium compound and a plutonium compound, granulating the resulting blend in the presence of a dispersion medium to produce small spheres and subjecting the small spheres to drying and heating for firing.

2. A process according to claim 1, wherein said thorium compound, uranium compound or plutonium compound are nitrates, oxides and organic carboxylates.

3. A process according to claim 2, wherein said organic carboxylates are acetates.

4. A process according to claim 1, wherein said dispersion medium is a member selected from the group consisting of water, an organic solvent and mixtures thereof.

5. A process according to claim 4, wherein said organic solvent is a member selected from the group consisting of a mono- or di-hydric alcohol having 1 to 6 carbon atoms, a dialkylformamide, dimethyl sulfone and methyl cellosolve.

6. A process according to claim 1, wherein said β-1,4-glucan powder, dispersion medium and compound are employed in amounts of 20 to 40% by weight based on the total weight of the three components, 20–45% by weight based on the total weight of the three components and 10–25% by weight, in terms of the amount of metal, based on the total weight of the three components, respectively.

7. A process according to claim 1, wherein said β-1,4-glucan powder has an average particle size of 10 to 60 μ.

8. A process according to claim 1, wherein the granulating is effected using in combination an extruding granulator and a rotating granulator.

9. A process according to claim 1, wherein the drying and the heating are effected at a temperature elevation rate of 120° C./hour or less for the heating to 450° C. or lower and are effected at a temperature elevation rate of 400° C./hour or less for the heating to higher than 450° C.

10. A process according to claim 1, wherein the heating is effected in an atmosphere of inert gas.

11. A process according to claim 1, wherein the heating to a temperature of 250° to 350° C. is effected in an oxidizing atmosphere and the heating to a temperature of more than 350° C. is effected in an atmosphere of inert gas.

12. A process according to claim 1, wherein the final temperature of said firing is 800° to 1,800° C.

13. A fuel kernel for coated particle fuels for use in a high-temperature gas-cooled reactor as produced by the process of claim 1.

* * * * *